(12) United States Patent
Loughlin et al.

(10) Patent No.: US 6,507,985 B1
(45) Date of Patent: Jan. 21, 2003

(54) SNAP RING INSTALLATION TOOL AND METHOD

(75) Inventors: Neil W Loughlin, Ortonville, MI (US); Eric D Emmer, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/520,420

(22) Filed: Mar. 8, 2000

(51) Int. Cl.[7] ............................................... B23P 19/04
(52) U.S. Cl. .............................. 29/229; 29/215; 29/263; 29/255
(58) Field of Search ........................... 29/225–229, 215, 29/221.5, 255, 263, 280, 282, 272, 230

(56) References Cited

U.S. PATENT DOCUMENTS

| | | | | |
|---|---|---|---|---|
| 1,379,310 A | * | 5/1921 | O'Sullivan | 29/229 |
| 3,762,021 A | * | 10/1973 | Racin | 29/263 |
| 4,765,048 A | * | 8/1988 | Hokanson | 29/229 |
| 5,097,580 A | * | 3/1992 | Story | 29/229 |
| 5,111,737 A | | 5/1992 | Dormer et al. | |
| 5,367,945 A | | 11/1994 | Halka et al. | |
| 5,375,308 A | * | 12/1994 | Harris | 29/215 |
| 5,549,034 A | | 8/1996 | Loughlin | |

* cited by examiner

*Primary Examiner*—Lee Wilson
(74) *Attorney, Agent, or Firm*—Edwin W. Bacon, Jr.

(57) ABSTRACT

Tooling and process for installing a split type, circular snap ring into a slotted or grooved wrist pin journal of a piston utilizing an installation sleeve member with an internal bore therethrough which is positioned against the piston so that its bore is aligned with the piston's wrist pin journal. The bore in the installation sleeve including a tapered passage to progressively radially inwardly constrict the snap ring as it moves axially through the installation sleeve. An elongated plunger assembly is moved axially to engage the snap ring and move it through the bore of the installation sleeve. The plunger assembly is sized to permit it to move through the entire extent of the tapered portion and into the piston's journal so that in turn the snap ring is moved into the wrist pin journal and finally into alignment with a retainer slot or groove into which the snap ring can radially expand outwardly into a seated position.

3 Claims, 5 Drawing Sheets

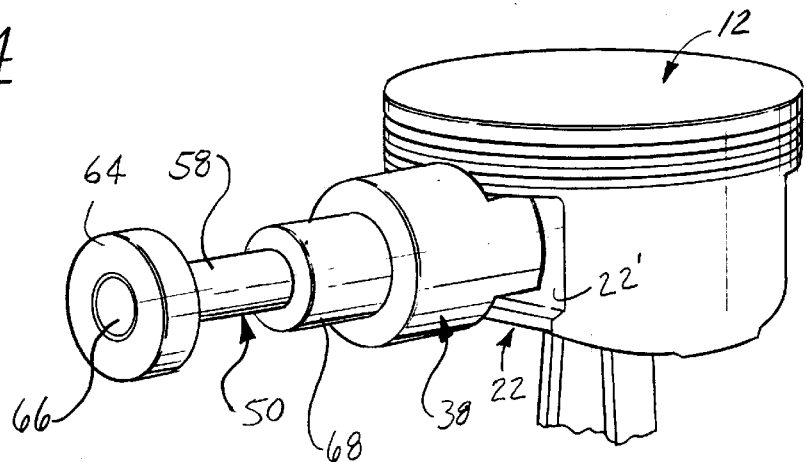
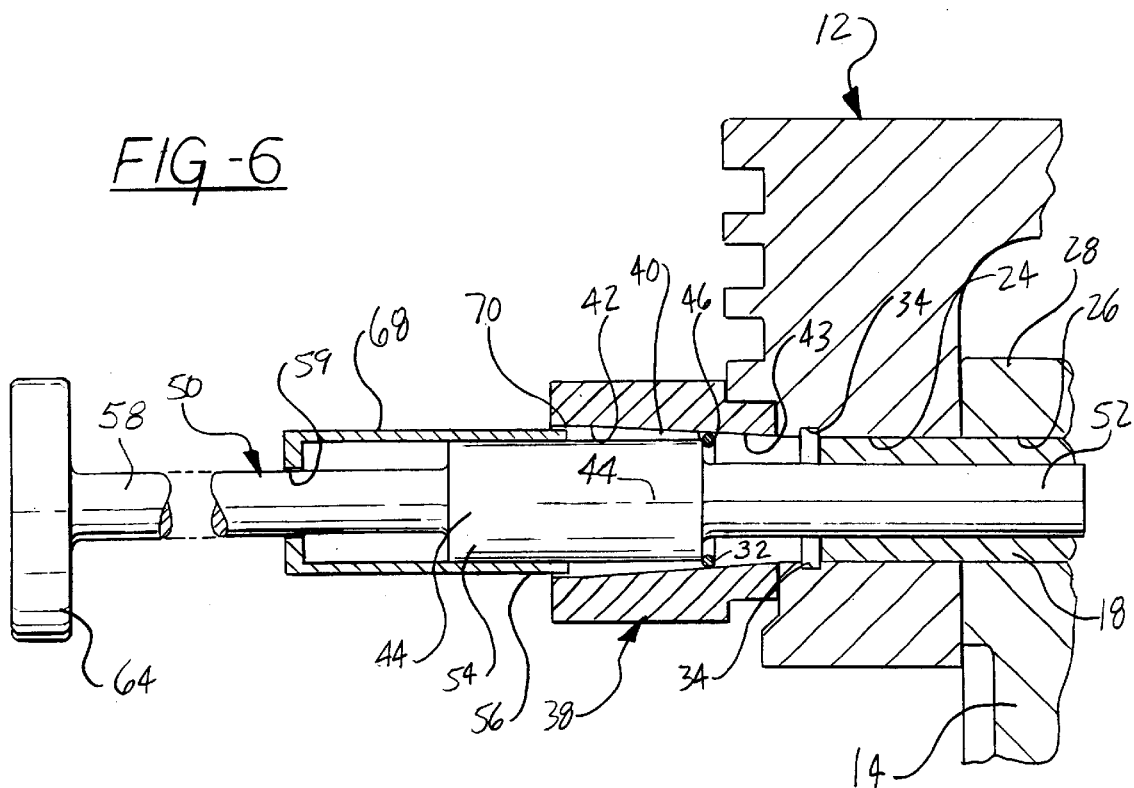

SNAP RING INSTALLATION TOOL AND METHOD

TECHNICAL FIELD

This invention relates to a tool for installing a snap ring retainer into operative assembly position in a piston and more particularly to new and improved tooling for seating a snap ring retainer into an annular slot formed in a wrist pin receiving bore of a piston to maintain the wrist pin in a central position such that the ends of the wrist pin are maintained in a desired spaced relationship away from the engine's cylinder wall. This invention further relates to a new and improved method of installing a snap ring retainer into an annular slot formed in the wrist pin receiving bore of the pistons.

BACKGROUND OF THE INVENTION

In internal combustion engines, a fall floating wrist pin are used to pivotally attach an end of a connecting rod to a piston for the purpose of accommodating reciprocating stroking movement of a piston in an associated cylinder of an internal combustion engine. Such a wrist pin support advantageously provides two stages or levels of wrist pin freedom during piston operation tending to reduce pin and bearing friction and wear. When properly installed in a piston and connecting rod assembly, a free floating wrist pin has the capability of relative rotation with respect to the connecting rod and with respect to a bearing or bore formed in the piston. This wrist pin bore in the piston consists of a pair of aligned bores extending through spaced apart boss-like portions of the piston.

During engine operation, the wrist pin is typically subjected to thrust loads in the lateral direction or axially of the wrist pin. This usually is caused by sideways moments of the associated connecting rod during piston stroking in the associated engine cylinder. If the wrist pin is allowed to be displaced a distance where an end of the pin physically contacts and rubs against the cylinder wall during engine operation, the cylinder wall and the piston may be damaged which might necessitate expensive repairs. To prevent such an occurrence, each piston utilizes snap ring retainers or wire end locks made of spring steel located at each end of the wrist pin. Specifically, the snap ring retainer is operatively mounted in an annular blind retainer slot or groove formed in the piston's wrist pin bore positioned at the outboard end of the wrist pin. A snap ring retainers at each end of the wrist pin maintains the wrist pin in centered position with each end portion spaced away the respective cylinder wall thus eliminating any potential damage to the cylinder wall and the piston.

Previously, punches and other similar hand tools have been used to force the snap ring into a radially constricted configuration and into the end portion of the pin bore for subsequent radial expansion into its annular blind retainer slot. Specifically, a tubular guide sleeve has been used to feed or move a snap ring retainer into and along wrist pin bores. However, use of this tubular guide sleeve has proven difficult especially for initially aligning the retainer and maintaining alignment once in the wrist pin bore. Even those having a high level of mechanical skill experience pop-out of a snap ring retainer from the guide sleeve at either the inboard or outboard end of the wrist pin bore rather than desired seating in the associated annular blind retainer slot. Thus, difficulties are often encountered by use of such tools in the installation of resilient snap ring retainers partly due to the problem of sensing exactly when the snap ring retainer is aligned with the annular blind retainer slot. Use of such tools frequently overcompresses the snap ring retainers in an inward radial direction which results in a weakened outward radial retention force necessary for the snap ring retainer to maintain its retention in the annular blind retainer slot. Use of these tools also imposes significant side loads on the snap ring retainers sufficient to distort and overstress the snap ring retainer and the damage is often sufficient to prevent a proper seating of the snap ring retainer in the annular blind retainer slot. Resultantly, this damage sometimes results in a disengaging movement or "popping-out" of the snap ring retainer from it's annular blind retainer slot which may possibly permit undesirable contact of an end of the wrist pin with the cylinder wall.

SUMMARY OF THE INVENTION

An object of this invention is to provide a new and improved installation tool for seating a snap ring type retainer into an associated annular blind retainer slot formed in a piston's wrist pin bore so as to properly maintain the wrist pin in a centered relationship with the piston. The tool further ensures that the snap ring retainer is not subjected to any substantial deformation which might damage the snap ring retainer and cause it to subsequently pop-out of its annular blind retainer slot. Typically, each piston utilizes two snap ring retainers, each seated in its own annular blind retainer slot formed in the piston's wrist pin receiving bores. One of the snap ring retainers is located at each of the opposite ends of the wrist pin for controlling axial movements of the wrist pin. Difficulties occur both in initially constricting the snap ring retainers in a radial direction and in then inserting and moving the snap ring retainer along the wrist pin bore. In addition, it is difficult to sense when the snap ring retainer has been axially displaced into a desired position where the snap ring retainer is free to radially expand or snap outward into the annular blind retainer slot which slots are hidden during installation of the snap rings.

By use of the subject installation tool, the snap ring retainer is gradually constricted radially to a predetermined diameter insufficient to result in over-compression as it is moved progressively into and along the piston's wrist pin bore. This simplifies the overall installation of the snap ring retainer from its initial loading into a guide and installation sleeve portion to its final insertion where the snap ring retainer expands into it's annular blind retainer slot. Further, the use of this tool is very straight forward so that it is readily used by persons even with minimal mechanical skills. Further, the subject tool fully contains and confines the snap ring retainers during installation thus minimizing any opportunity for the snap ring retainer to pop out or be damaged from over stressing.

Another object of this invention is to initially position and support the snap ring retainer in a guide and installation portion of the tool which has a fixed diameter bore adapted to receive the snap ring retainer and further having another portion with a tapered or funnel-like configuration to move the snap ring retainer and simultaneously radially constrict the snap ring retainer. This structure maintains the snap ring retainer in a natural transverse orientation and evenly loads it during displacement toward the annular blind retainer slot and also importantly minimizes the extent of the snap ring retainer's radial constriction. Accordingly, the radial compression or constriction of the snap ring retainer is carried out by the progressively tapered inner bore of the installation sleeve which has a minimum internal diameter corresponding to only a just sufficient minimum diameter equal to the diameter of the piston's wrist pin bore so as to prevent overcompression of the snap ring retainer and thus any chance of damage.

Another object of this invention is to simplify installation of wrist pin snap ring retainers and minimize loss or damage of such snap ring retainer during installation. The tool includes an installation sleeve with a tapered bore having a minimum internal diameter equal to the piston's wrist pin bore diameter for preventing over constriction or compression of the snap ring retainer. Cooperating with the installation sleeve is a specialized plunger assembly having a forward pin setting portion for piloting the snap ring retainer into the internal diameter of the piston's wrist pin bores. The plunger assembly includes an intermediate and solid cylindrical body section formed with an inboard end that fits into the inner diameter of the pin bore and serves to displace the snap ring in the installation sleeve and then from the installation sleeve into the pin bore and then smoothly into its retainer groove. The thin wall cylindrical sleeve is mounted on the intermediate cylindrical body section for initially moving the snap ring from its original position in the guide sleeve to a constricted position in which the cylindrical body can further be displaced relative to the guide sleeve and cylindrical sleeve to fully and properly seat the snap ring in its retainer groove.

These and other features, objects and advantages of this invention will become more apparent from the following detailed description and the drawings on some preferred embodiments of the invention:

BRIEF DESCRIPTION OF THE DRAWINGS

FIG. 4 is a perspective view of the remainder of the tooling assembly according to this invention set up to install a snap ring retainer to the piston; FIG. 6 is a cross sectioned elevational view of the tooling shown in FIG. 5 illustrating an intermediate step in the installation operation of a snap ring retainer to a piston and showing a control radial constricting of the snap ring retainer.

DETAILED DESCRIPTION

Figure 1:
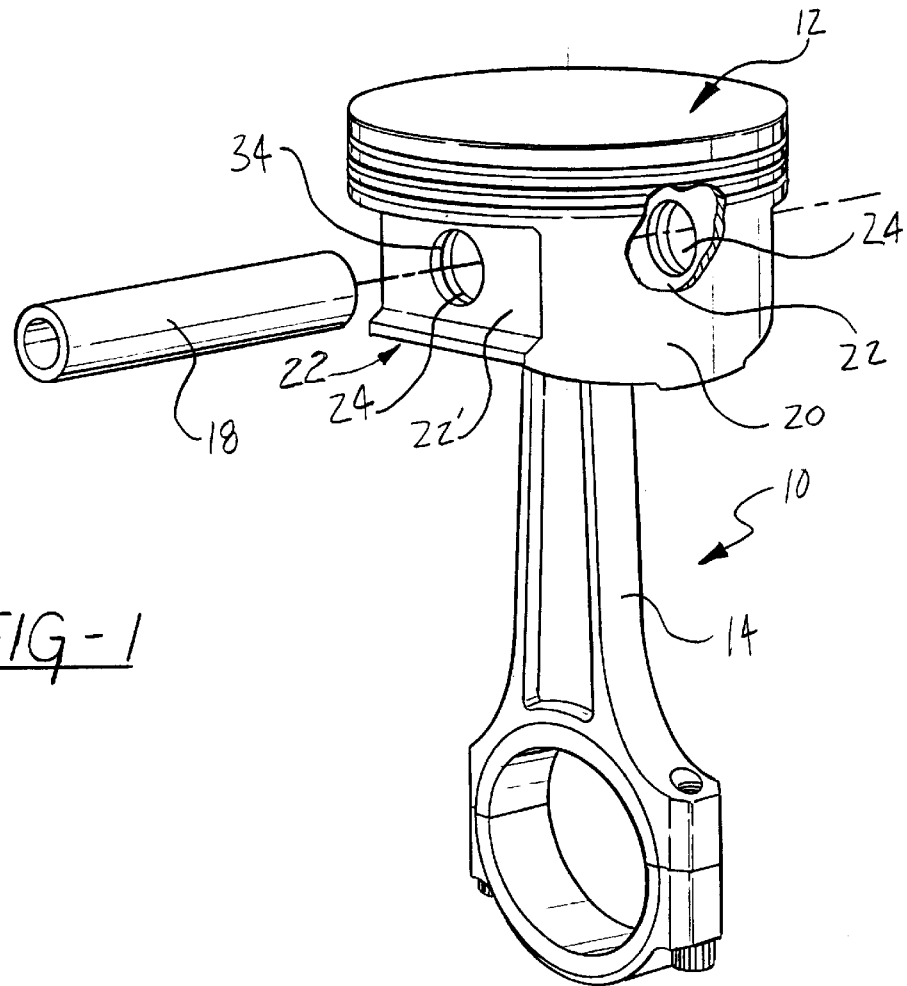
FIG. 1 a perspective view of a piston and connecting rod assembly with a wrist pin in a pre-installed position.
Figure 5:
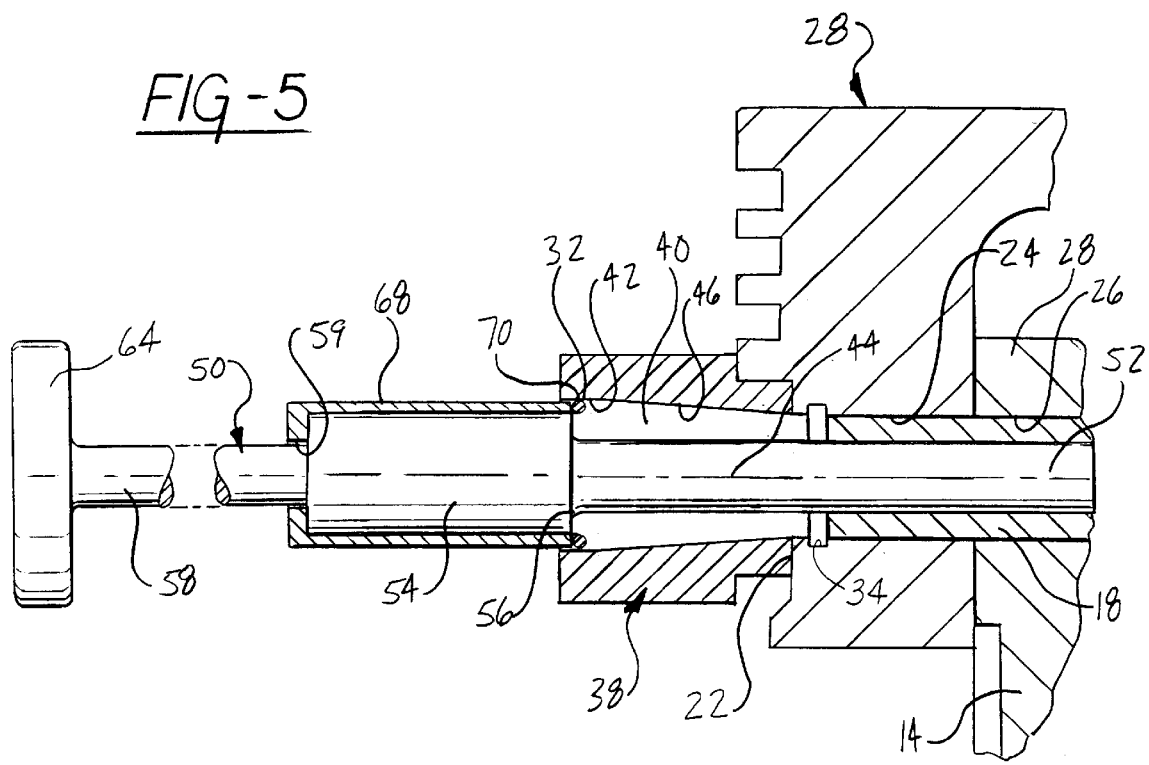
FIG. 5 is a cross sectioned elevational view of the tooling shown in FIG. 4 illustrating the beginning of installation operation of a snap ring retainer to a piston.

Turning now in detail to the drawings, a piston and connecting rod assembly 10 for an internal combustion engine is illustrated in FIG. 1. The assembly 10 comprises a cylindrical piston 12 which is adapted to be pivotally connected to an upper end portion of an elongated connecting rod 14 by a tubular wrist pin member 18. The piston 12 has an annular skirt portion 20 in which a pair of laterally spaced side boss portions 22 are provided. Each side boss 22 has a cylindrical bore 24 therein which bores are coaxially aligned so as to permit insertion of the wrist pin 18 therethrough. The diameter of the wrist pin 18 is sized to permit rotation in the bores 24 during operation of the associated engine accompanied by reciprocation of the piston 12 in an associated cylinder bore. Referring to FIG. 5, the upper end portion 28 of the connecting rod 14 has a cylindrical bearing surface 26 formed by a bore which extends transversely and through which the wrist pin 18 extends. The diameter of the bore in end portion 28 relative to the diameter of the wrist pin 18 allows relative rotation therebetween during operation of the associated engine and accompanied by reciprocation of the piston 12 in an associated cylinder bore.

Figure 7:
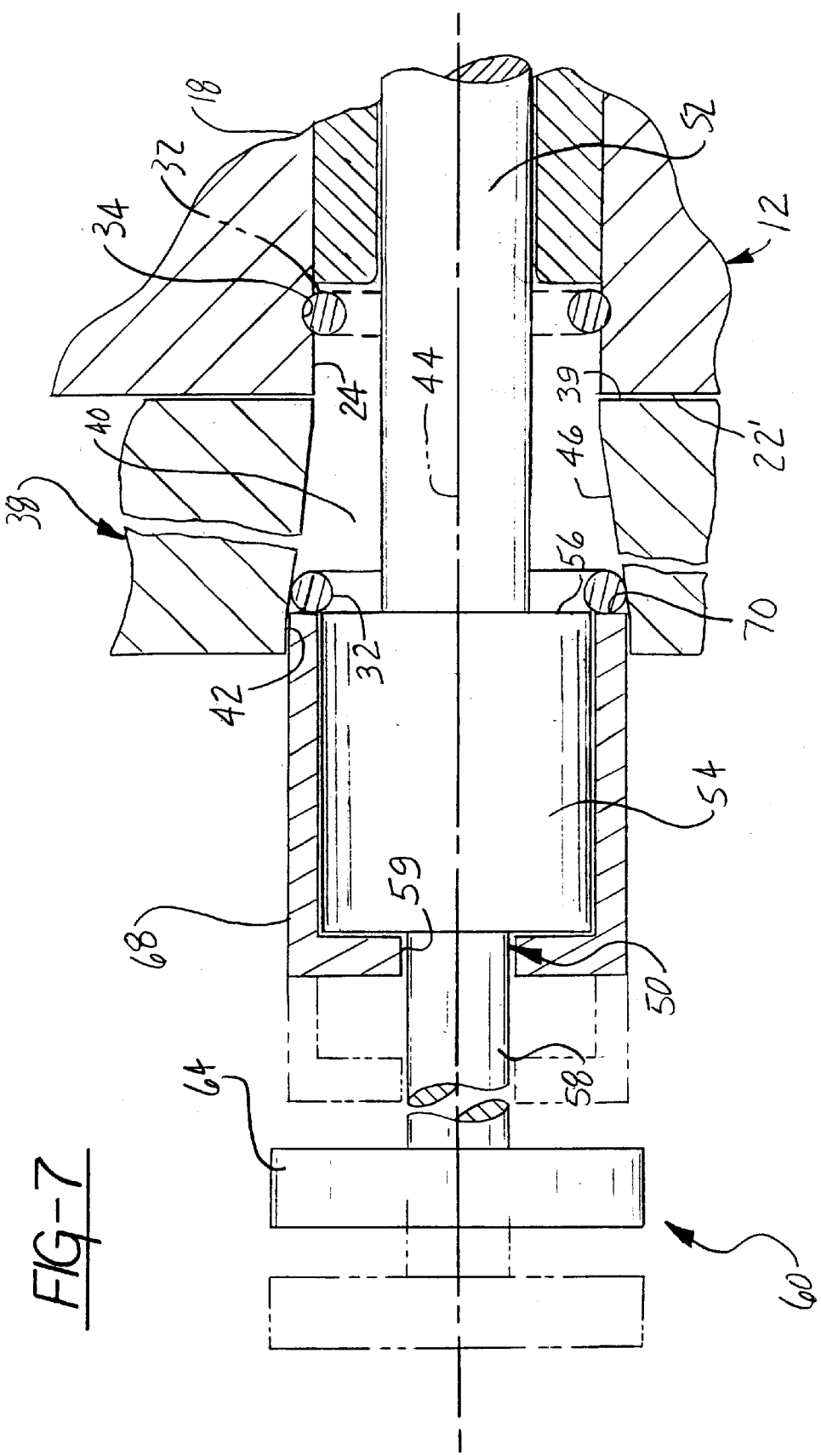
FIG. 7 is an enlarged and somewhat diagrammatic elevational view showing progressive movement of and radial inward constriction of the snap ring retainer as it is installed into a final position engaging an annular blind retaining slot of the piston.

As probably most clearly shown in FIG. 7, the wrist pin 18 is maintained within the bores 24 in a substantially central location in the piston 12 as defined by a desired lateral spacing between the surface 22' of the side boss 22 and the end 18' of the wrist pin 18. This position of the wrist pin 18 is maintained by a pair of snap ring retainers 32 (one shown in FIG. 7) which prevent any substantial axial movement of the wrist pin 18. The retainers 32 are of spring steel and designed to be capable of being radially constricted and spring-back radially outwardly from the constricted condition. When a snap ring retainer 32 is seated in respective annular blind retainer slots or grooves 34 formed in a bore 24 as seen in FIG. 7, the wrist pin's end 18' is restrained from axial or lateral movement. In this seated position, the inner diameter portion of the snap ring retainer projects radially inward into the bore 24 to block movement of the wrist pin. Thus, the wrist pin 18 is captured between the two snap ring retainers at either side of the piston and thus it cannot be displaced in the axial direction to a more outward positions past the side surface 22' of the piston skirt 20. If the wrist pin were to be allowed to move outwardly, it could contact the cylinder bore and physically abrade and otherwise damage the cylinder wall and even eventually damage the piston and its piston rings.

As previously pointed out, there are difficulties in first constricting and then installing a snap ring type retainer into a bore and thus seat it in an annular blind retainer slot or groove. These difficulties have been addressed and solved by this inventive tool and process.

Figure 2:
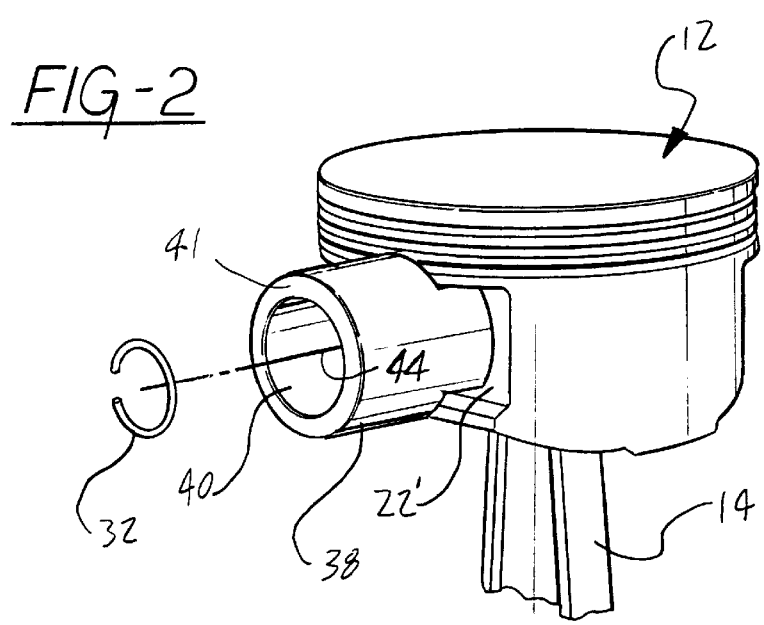
FIG. 2 is an enlarged view of the piston and connecting rod assembly shown in FIG. 1 illustrating one part of the tooling assembly according to this invention utilized to install a snap ring retainer the wrist pin bore of the piston.
Figure 3:
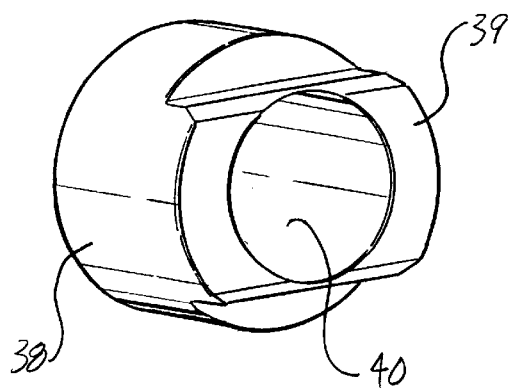
FIG. 3 is a perspective view of the part of the tooling shown in FIG. 2.

The initial basic component of the installation tool is a cylindrically shaped snap ring guide and installation sleeve 38 as best seen in FIGS. 2 and 3. The sleeve's inboard end portion 39 is configured to mate with the outer face or surface 22' of the piston's side boss portion 22. The outwardly directed end portion 41 of the sleeve member 38 includes ring guiding bore 40 which extends through sleeve 38 and functions to guide the snap ring retainer into the piston's bore 24. As best shown in FIG. 7, the bore 40 has a "lead-in" cylindrical portion 42 with a constant diameter designed to initially receive an annular snap ring retainer 32. In the preferred embodiment, the diameter of the lead-in portion 42 is sized to very slightly radially constrict the snap ring retainer 32 for ease in "loading" and retaining the snap ring within the sleeve portion 38. With this construction, the snap ring retainer 32 can be readily inserted into the lead-in and is maintained therein in a substantially "squared" starting position. Subsequently, the retainer 32 is moved axially through the sleeve 38 accompanied by inward radial constriction toward the center axis 44 of bore 42. This radial constriction is accomplished by axial movement along a tapered guide bore portion 46 extending from the fixed diameter or lead-in portion 42 to the sleeve's end surface 39 which is in abutting relation to the piston's surface 22'. The diameter of the tapered bore portion 46 progressively decreases in a manner to inwardly radially constrict the snap ring retainer until its diameter eventually matches the diameter of the piston's bore 24. The gradual transition provided by the guide and installation sleeve 38 facilitates a non-stressful movement of the snap ring retainer 32 into the bore 24.

Alignment of the inward end portion of the tapered bore 46 and the piston's bore 24 is established and maintained by an elongated plunger assembly 50 which has a pilot stem portion 52 adapted to be inserted into the inner diameter center of the tubular wrist pin 18. This aligns the tool's longitudinal axis with the axis of the wrist pin 18 and the bore 24.

In addition to the pilot stem portion 52, the plunger assembly 50 includes a cylindrically shaped snap ring displacement body portion 54. The diameter of the displacement body portion 54 is only slightly smaller then the diameter of the piston's bore 24. Accordingly, when the displacement body portion 54 is moved axially toward the right as see in FIG. 7, it progresses the snap ring retainer 32 along the tapered portion 46 and into the piston's bore 24. Eventually, the snap ring retainer 32 is seated in an annular blind slot or groove 34. Specifically, the forward or rightward end of the displacement body portion 54 carries a flat end ring portion 56 which allows it to engage the snap ring retainer once it has been radially constricted by beginning movement through the tapered bore portion 46 of the installation and guide sleeve 38.

The plunger assembly 50 further includes a connector stem 58 which projects axially from the displacement body portion 54 to an exteriorly positioned handle portion 60. The handle portion 60 preferably is configured as an enlarged diameter knob 64 readily engaged by an installer of the snap ring retainer. The knob 64 is secured to the end of the stem portion 58 by a threaded fastener 66 as seen in FIG. 4. The diameter of the knob 64 is sized to conformably fit the palm of the installer's hand and is sufficient to spread the manually applied load evenly over the snap ring retainer 32.

The plunger assembly 50 is provided with a tubular snap ring support sleeve member 68 which has a rightward opened end portion and a leftward closed end portion. The closed end portion has an aperture 59 to receive stem portion 58 therethrough. This construction permits axial movement of the handle, stem and displacement portions 64, 58, 54 relative to the support sleeve member 68. As the displacement portion 54 is moved to the right, the snap ring retainer 32 is moved through the bore 40 of the tubular sleeve member 38.

As best shown in the sequence found in FIGS. 5 through 7, the edge of sleeve member 68 defines an annular contact 70 having a diameter corresponding to diameter of the snap ring retainer when only slightly constricted as initially installed in the lead-in portion 42 of installation sleeve 38. Specifically, FIG. 5 shows the alignment of the annular contact surface 70 with the snap ring retainer 32 at the start of the installation. Axial movement of the plunger assembly 50 produces rightward movement of the snap ring retainer 32 along and through the tapered bore 46.

Figure 8A:
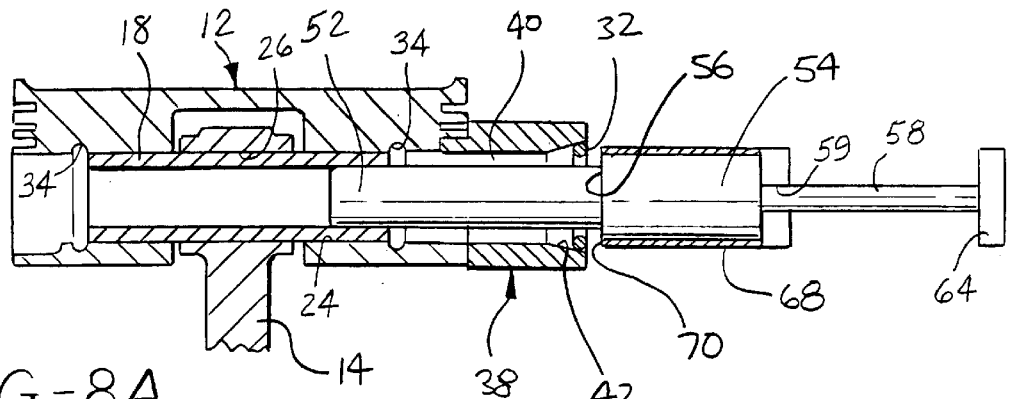
FIGS. 8a, 8b, 8c are sectioned and somewhat diagrammatic elevational views illustrating the installation operation of the subject tool.
Figure 8B:
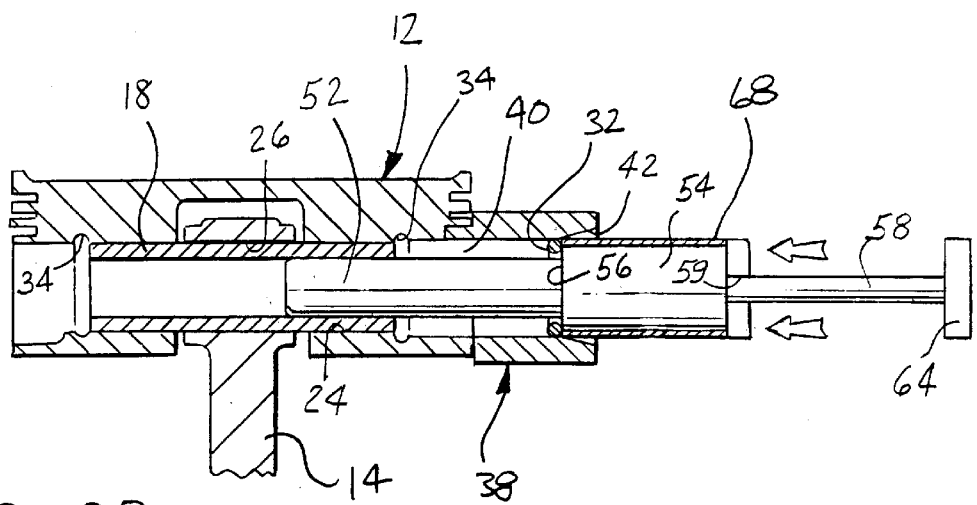
Figure 8C:
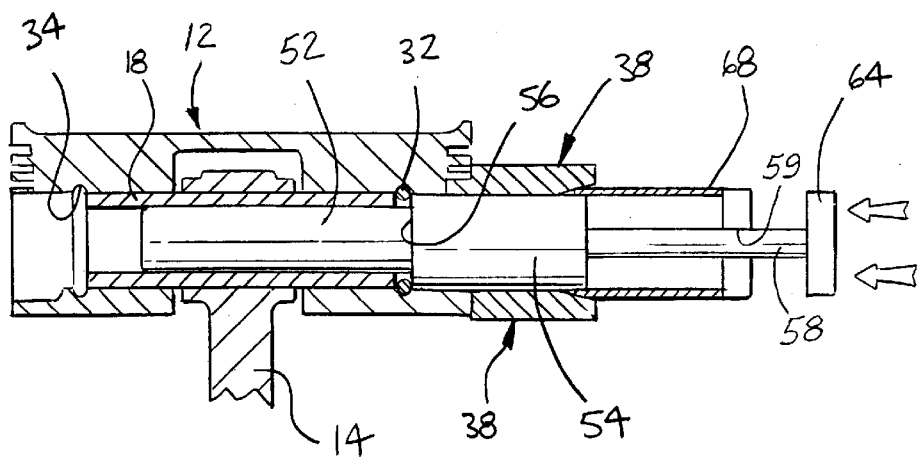

The sequence of the preferred method of installing a snap ring retainer is shown in FIGS. 8a, 8b and 8c. The snap ring retainer 32 is manually or otherwise positioned or loaded into the lead-in portion or bore 42 of the installation sleeve member 38. The sleeve member 38 is manually pressed against the outer face 22' of the piston's side boss. FIG. 8a illustrates a start installation position with the displacement body portion 54 of the plunger assembly 50 telescoped within the thin walled installation sleeve member 68. The guide and alignment stem portion 52 extends into the inner diameter of wrist pin 18 to align the plunger assembly with the bore 24 and wrist pin 18. The thin wall sleeve member 68 and the plunger assembly 50 are moved manually to the left from the position in FIG. 8a to the position of FIG. 8b in which the sleeve member 68 can not move further to the left because of contact with the wall of tapered bore 46. During this slight movement, the sleeve member's end 70 has axially displaced the snap ring retainer accompanied by the beginning of radially inward constriction of the snap ring retainer 32. With the end 70 of the sleeve 68 engaging the beginning of the tapered bore, leftward movement of the handle 64 of plunger assembly 50 is possible. This leftward movement from the position in FIG. 8b to the position of FIG. 8c involves sufficient radially inward constriction of the snap ring retainer 32 so that its reduced outer diameter allows it to enter the bore 24. The plunger assembly 50 is further advanced until the snap ring retainer 32 attains an axial position in bore 24 so that it is aligned with the annular blind retainer slot or groove 34. At this position, the snap ring retainer 32 expands radially outwardly into the slot or groove 34. This expansion and subsequent contact of the snap ring retainer 32 in the groove 34 produces a noticeable noise which advises the installer that the snap ring retainer has been successfully seated. The tool is then easily removed.

Once a snap ring retainer has been installed on one side of a piston, the tool is used in the same manner to install a snap ring retainer in the bore on the other side of the piston. This captures the wrist pin therebetween in a central or centered position.

While a preferred embodiment of the invention has been shown and described, other embodiments will now become apparent to those skilled in the art. Accordingly, this invention is not to be limited to that which is shown and described but by the following claims.

What is claimed is:

1. Tooling for installing a circular resilient snap ring into an annular groove in an annular wrist pin bore in a piston for retaining a tubular wrist pin therein comprising:

a snap ring installation sleeve having an internal through passage extending from a spring entrance end to a spring discharge end, said sleeve having a base portion adapted to be seated on the piston and in alignment with the annular wrist pin receiving bore, said through passage being tapered to progressively constrict said snap ring as it is being displaced from said entrance to said discharge end, an elongated snap ring installation plunger having an inboard end and an outboard end, at the inboard end an inboard stem for sliding axial reception in the tubular wrist pin, said plunger having a cylindrical ring displacement body between the inboard and outboard ends and a manual handle at the outboard end, a cylindrical ring displacement sleeve mounted for axial sliding movement on said ring displacement body, said ring displacement sleeve having a free end for initially engaging said snap ring and displacing said ring in said tapered bore to a predetermined position therein to thereby constrict said ring to a predetermined stresslevel to prevent overstress, said ring contact body having a ring contact surface at the inner end there of which matches and contacts said constricted ring, said plunger being axially movable relative to said ring displacement sleeve so that said ring displacement body can further move said ring into said bore and into alignment with said annular groove allowing said ring to expand therein and be retained thereby.

2. Tooling for installing a circular snap ring of spring wire into an internal retainer groove in a cylindrical wrist pin bore in a piston for retaining a wrist pin therein comprising:

- a snap ring installation sleeve having an internal and axially disposed passage extending from a snap ring entrance end through a snap ring exit end adapted to be seated on the piston and in alignment with the annular wrist pin receiving bores in the piston, said passage being tapered to progressively constrict said snap ring as it is being displaced from said entrance to said exit end,
- an elongated snap ring installation plunger having an inboard end and an outboard end, a cylindrical stem at the inboard end for sliding reception in the tubular wrist pin, said plunger having a fixed cylindrical ring displacement body between the inboard and outboard ends and a manual handle at the outboard end,
- a cylindrical ring displacement sleeve mounted for relative axial sliding movement on said ring contact body, said ring displacement sleeve having a free end for initially engaging said snap ring and displacing said ring in said tapered bore to a predetermined sleeve grounding position therein to thereby constrict said ring to a predetermined diameter to align with the end of the cylindrical ring displacement body, said ring displacement body having a ring contact face at the inner end thereof which matches and contacts said constricted ring for further urging said ring into said bore and into alignment with said annular ring retainer groove so that said ring can expand therein and be retained thereby.

3. Tooling for installing a circular snap ring into an internal retainer groove in a wrist pin bore in a piston for retaining a wrist pin therein comprising:

- a snap ring installation sleeve having an internal and axially extending through passage extending through a base portion adapted to be fully seated on the piston and in alignment with the annular wrist pin receiving bores in the piston, said through passage being tapered to progressively constrict said snap ring as it is being displaced from said entrance to said discharge end,
- an elongated snap ring installation plunger having an inboard end and an outboard end, at the inboard end a forward stem for axial reception and sliding in the tubular wrist pin, said plunger having a cylindrical ring displacement body intermediate the opposite ends thereof and a manual handle at the outboard end,
- a thin walled cylindrical ring displacement sleeve mounted for axial sliding movement on said ring contact body , said ring displacement sleeve having a free end for initially engaging said snap ring and displacing said ring in said tapered bore to a predetermined position thereon to thereby constrict said ring without overstress said ring, said ring contact body having a ring contact surface at the inner end thereof which matches and contacts said ring as constricted for further urging said ring into said bore and then into alignment with said annular groove so that said ring can expand therein and be retained thereby.

* * * * *